(12) United States Patent     (10) Patent No.: US 9,323,431 B2
Farshi et al.     (45) Date of Patent: Apr. 26, 2016

(54) USER INTERFACE FOR DRAWING WITH ELECTRONIC DEVICES

(75) Inventors: Oliver Farshi, San Francisco, CA (US); Tommi Ilmonen, Esspoo (FI)

(73) Assignee: MultiTouch Oy, Helsinki (FI)

( * ) Notice: Subject to any disclaimer, the term of this patent is extended or adjusted under 35 U.S.C. 154(b) by 38 days.

(21) Appl. No.: 14/348,045

(22) PCT Filed: May 31, 2012

(86) PCT No.: PCT/FI2012/050538
§ 371 (c)(1),
(2), (4) Date: Mar. 27, 2014

(87) PCT Pub. No.: WO2013/178867
PCT Pub. Date: Dec. 5, 2013

(65) Prior Publication Data
US 2014/0258898 A1    Sep. 11, 2014

(51) Int. Cl.
   *G06T 11/20*     (2006.01)
   *G06F 3/0484*    (2013.01)
   *G06F 3/0488*    (2013.01)
(Continued)

(52) U.S. Cl.
CPC .......... *G06F 3/0484* (2013.01); *G06F 3/04845* (2013.01); *G06F 3/04883* (2013.01); *G06K 9/48* (2013.01); *G06T 11/001* (2013.01); *G06T 11/203* (2013.01); *G06T 7/0063* (2013.01); *G06T 11/60* (2013.01)

(58) Field of Classification Search
CPC . G06F 3/0416; G06F 3/0481; G06F 3/04845; G06F 15/18; G06F 17/50; G06F 3/048; G06T 11/203; G06T 11/206; G06T 11/20; G06T 11/40; G06T 11/60; G06T 11/80; G06T 17/00; G06T 7/0063
USPC ......... 715/232, 255, 764, 769, 801, 800, 863; 345/441, 442, 443, 440, 467, 773, 661
See application file for complete search history.

(56) References Cited

U.S. PATENT DOCUMENTS 5,588,100 A    12/1996   Parker
5,889,523 A     3/1999   Wilcox
(Continued)

FOREIGN PATENT DOCUMENTS

EP     0 566 294 A2    10/1993
EP     0697679       2/1996
(Continued)

OTHER PUBLICATIONS

"Google Docs—Create a Drawing" Screenshots (Uploaded on Apr. 21, 2010) https://www.youtube.com/watch?v=Y097HblKru0.*
(Continued)

*Primary Examiner* — Alvin Tan
*Assistant Examiner* — Rinna Yi
(74) *Attorney, Agent, or Firm* — Shalom Wertsberger; Saltamar Innovations

(57) ABSTRACT

A method, apparatus and computer program for forming graphics in a drawing area based on user instructions. In response to addition or changing of a first graphical object, an interaction zone is formed around the first graphical object for a given continuation period. It is detected if a second graphical object is drawn starting from the interaction zone during the continuation period and if yes, the first graphical object is changed by merging the second graphical object with the first graphical object.

23 Claims, 8 Drawing Sheets

(51) Int. Cl.
*G06K 9/48* (2006.01)
*G06T 11/00* (2006.01)
*G06T 11/60* (2006.01)
*G06T 7/00* (2006.01)

(56) References Cited

U.S. PATENT DOCUMENTS

| | | | |
|---|---|---|---|
| 7,259,752 B1 * | 8/2007 | Simmons | 345/173 |
| 2006/0262134 A1 * | 11/2006 | Hamiter | G06F 19/321 345/619 |
| 2009/0122066 A1 | 5/2009 | Iijima | |
| 2010/0079465 A1 | 4/2010 | Hsu et al. | |
| 2011/0265034 A1 | 10/2011 | Garin et al. | |
| 2012/0113017 A1 | 5/2012 | Benko | |
| 2013/0305172 A1 * | 11/2013 | Joshi | G06F 3/048 715/764 |

FOREIGN PATENT DOCUMENTS

| | | |
|---|---|---|
| JP | H07-57053 A | 3/1995 |
| JP | H08-161426 A | 6/1996 |
| JP | H10-49624 A | 2/1998 |
| JP | 2008-15929 A | 1/2008 |

OTHER PUBLICATIONS

JP 2008-015929 English machine translations (published on Jan. 24, 2008).*

* cited by examiner

USER INTERFACE FOR DRAWING WITH ELECTRONIC DEVICES

TECHNICAL FIELD

The present invention generally relates to a user interface for drawing with electronic devices.

BACKGROUND ART

Blackboards and chalks are being replaced by more modern whiteboards on which users can draw with felt tip pens so that the texts and drawings become read into a computer system. In digital form, the user input can also be easily stored and distributed. It is also possible to produce large touch displays on which the users can draw by their fingers or with some suited pens or styluses so that a computer forms drawings and texts as drawn by the user. Such touch screens can be thus used in a drawing mode in which new drawings can be made. It is also possible to show presentations on such touch screens in which case slides are shown on the display and changed to next or previous e.g. on touching the display. However, when many functions are provided by one element, the users need to be given suitable controls for selecting the desired operating mode. Such controls should be inexpensive, easy to learn, ergonomic and reliable.

An object of the present invention is to remove or mitigate the aforementioned problems or at least to provide one or more new technical alternatives for existing techniques.

SUMMARY

According to a first example aspect of the invention, there is provided method for forming graphics in a drawing area based on user instructions, comprising:
   in response to addition or changing of a first graphical object, forming an interaction zone around the first graphical object an interaction zone for a given continuation period; and
   detecting if a second graphical object is drawn starting from the interaction zone during the continuation period and if yes, changing the first graphical object by merging the second graphical object to the first graphical object.

By merging the second graphical object to the first graphical object the first graphical object is changed to contain both contents previously contained by the first and second graphical objects. Thus, the interaction zone is formed again, now for the combination of the earlier first graphical object and the second graphical object.

By merging a second graphical object to the first graphical object it may be understood that the first and second graphical objects are grouped together.

A new second graphical object may be drawn starting from changed interaction zone.

The interaction zone may be formed dynamically during the addition or changing of the first graphical object. The interaction zone may be dynamically formed on drawing a line as if using a large tip pen or brush.

The interaction zone may be formed when the first graphical object is completely added or changed. The completion of the adding or changing of the first graphical object may be determined from that a pause signal is received from a user. The pause signal may be comprise any of the following: releasing touch on a touch screen; releasing a button of a pointing device indicative of a desire to no longer continue the changing or adding of the first graphical object; and pressing a button indicative of a desire to no longer continue the changing or adding of the first graphical object.

Term graphical object may refer to any of: photographs, bitmap drawings, vector drawings, typography, numbers, symbols, maps. The drawings may be freehand drawings. Alternatively or additionally, the drawings may contain computer assisted forms such as lines, arcs, polygons and regression curves. The first and second graphical objects may be of similar or different type.

The method may further comprise causing displaying of the interaction zone. The interaction zone may have an appearance differing from the first graphical object. The interaction zone may be formed using a predetermined color. Alternatively, the interaction zone may be formed by changing underlying drawing area. The changing of the underlying drawing area may comprise one or more of changing brightness; changing color; changing pattern; changing contrast; blurring; pixelating; inversing one or more channels (such as RGB or chromaticity co-ordinates); causing temporally changing appearance such as blinking or gradually changing appearance; and causing a glow-effect.

The method may further comprise forming again the interaction zone around the first graphical object in response to detecting a user pointing at the first graphical object. A further command may be required for the forming again of the interaction zone, such as pressing a button, holding a button pressed for a given period of time, or pressing twice or more a button.

The method may be applied in parallel for two or more first graphical objects. More than one user may concurrently use the method. Different users may concurrently form graphics in the drawing area with pace independent of each another.

The method may comprise detecting a drawing initiation command from the user instructions.

The method may further comprise subsequently again invoking the interaction zone in response to detecting a re-invoking command and erasing a portion of the first graphical object in response to detecting drawing of a scribble over the first graphical object. The detecting of the drawing of the scribble may comprise determining at least two lines being drawn back and forth over the first graphical object. The detecting of the drawing of the scribble may comprise determining at least two lines being drawn back and forth over the first graphical object such that two or more of the at least two lines are overlapping over a distance that meets a threshold distance and/or that the two or more of the at least two lines have a mutual angle smaller than a threshold angle.

The threshold distance may be N times of line thickness. N may be 5 to 50 or e.g. 10 to 30. The threshold may comprise a distance measure such as 1 cm to 10 cm or e.g. 2 cm to 4 cm.

According to a second example aspect of the invention, there is provided an apparatus, comprising:
   an input configured to receive user instructions for forming graphics in a drawing area based on user instructions;
   a processor configured to cause:
      in response to addition or changing of a first graphical object, forming an interaction zone around the first graphical object an interaction zone for a given continuation period; and
      detecting if a second graphical object is drawn starting from the interaction zone during the continuation period and if yes, changing the first graphical object by merging the second graphical object to the first graphical object.

The apparatus may further comprise an output configured to control a display when functionally connected to the output.

The processor may further be configured to perform any embodiment of the first example aspect.

According to a third example aspect of the invention there is provided a computer program comprising computer executable program code which when executed by at least one processor causes an apparatus to perform the method of the first example aspect.

According to a fourth example aspect of the invention there is provided a computer program product comprising a non-transitory computer readable medium having the computer program of the third example aspect stored thereon.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

In the following description, like reference signs denote like elements.

Figure 1:
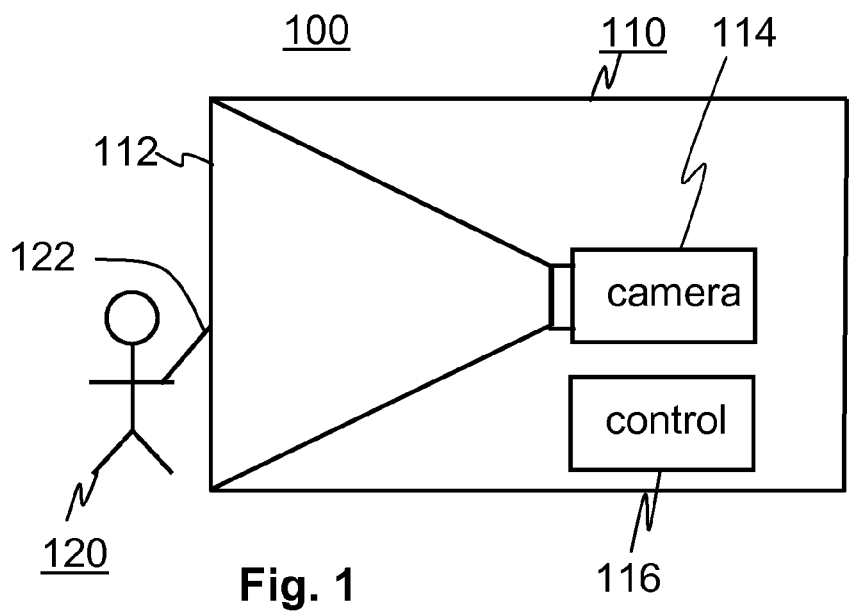
FIG. 1 shows a schematic picture of a system according to an example embodiment.

FIG. 1 shows a block diagram of a system 100 according to an embodiment of the invention. The system comprises an interactive display 110 that has a touch screen 112 capable of displaying information and a control unit 116 for controlling the operation of the interactive display 110. In FIG. 1, touch detection is performed optically using a camera 114 in a casing behind the touch screen 112. FIG. 1 also shows a user 120 with a pointing object 122 such as a finger or a stylus. In sake of simplicity, a finger will be used as an abbreviation of the pointing object 122. The system 100 is suited for use as an interactive user interface device e.g. as a built in dynamic menu in a restaurant, as a display screen at a ticket office, a whiteboard or an interactive display with optical pointing recognition. While a camera based system is shown in FIG. 1, any forms of touch screens can be used in different embodiments of the invention.

Figure 2:
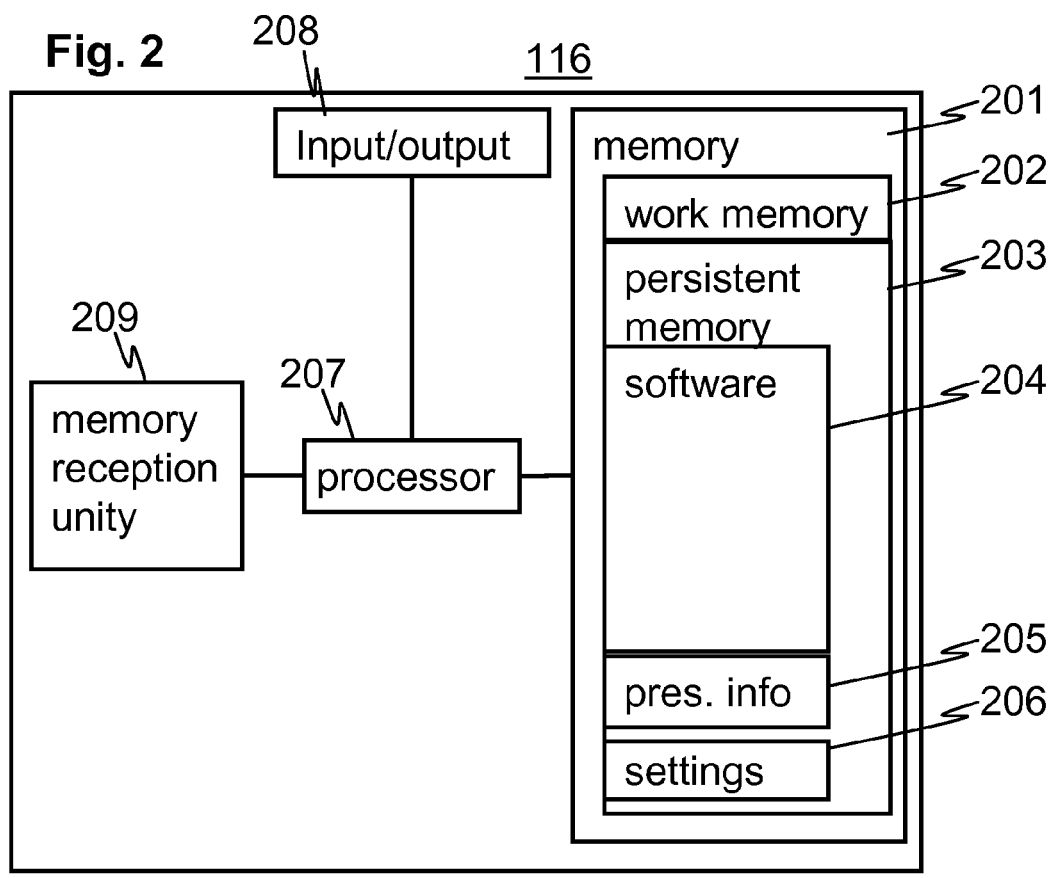
FIG. 2 shows a block diagram of a control unit according to an example embodiment of the invention.

FIG. 2 shows a simplified block diagram of the structure of the control unit 116. The control unit 116 may be based on, for example, a general purpose computer supplied with suitable software and/or on a particularly adapted computing device. While it is possible to implement the control unit 116 by purely hardware based a device, typically it is more economic and faster to produce by making use of software.

In FIG. 2, the control unit 116 is drawn to comprise a memory 201 that comprises a work memory 202, a non-volatile memory 203 that is configured to store software 204, presentation information 205 describing content to be presented by the system 100 and/or how pointing at different areas on the screen should be treated, and settings 206 needed e.g. for manual or automatic calibration of the system 100. The software 204 may comprise any one or more of the following items: operating system, device drivers, display presentation application, hypertext markup language parser, image processing software, and drivers for different external equipment that may be connected to the system such as printers, further displays, further interactive systems 100, audio systems, and external IR illumination equipment (not shown).

The control unit 116 further comprises a processor 207 configured to control the operation of the control unit 116 according to the software 204 by executing computer executable program code contained by the software in the work memory 202. Alternatively, the control unit may be configured to execute the software in place in the non-volatile memory in which case the work memory may not be necessary. The control unit further comprises an input/output unit (I/O) 208 for exchanging signals with other elements of the system 100 and optionally also with external equipment. The I/O 208 may comprise e.g. any one or more of a universal serial bus port, a local area network port, an ISA bus, a PCI express port, an IR port, a Bluetooth element, and a parallel port. Alternatively to being configured capable of communicating with external equipment, the system 100 may be provided with a transferable memory reception unit 209 such as a cd-rom or dvd-rom drive, memory card reader or memory stick reader which enables replacing part of the non-volatile memory e.g. for updating information to be displayed on the touch screen 112.

In order to control the operation of various components of the system and to obtain the captured image, there are connections between the control unit or particularly its input/output unit 208 and other components of the system 100, while not shown in sake of clarity of the drawing. The control unit has generally the task of receiving a signal from the camera 114, detecting if and where the touch screen 112 is pointed at and typically also outputting the determination in a standard way e.g. emulating a computer drawing tablet, mouse or other known pointing device.

Generally, the control unit operation may comprise following acts:

controlling the screen to show desired images to the user 120;

controlling the IR lights 110 to produce IR light on demand for showing a pointing object 122 such as a user's 120 finger when brought close to the screen;

obtaining signals corresponding to touching of the touch screen 112 from the camera 114;

detecting from the received signals the pointing object at the touch screen 112;

performing a predefined action based on the detected input, e.g. changing the image displayed on the touch screen 112 or following a hyperlink associated with the area at which the pointing object is detected.

It is appreciated that while the control unit may consist of one separate unit, the control unit 116 may alternatively be integrated with any other element or comprise two or more discreet elements each for one or more of the aforementioned acts.

Figure 3:
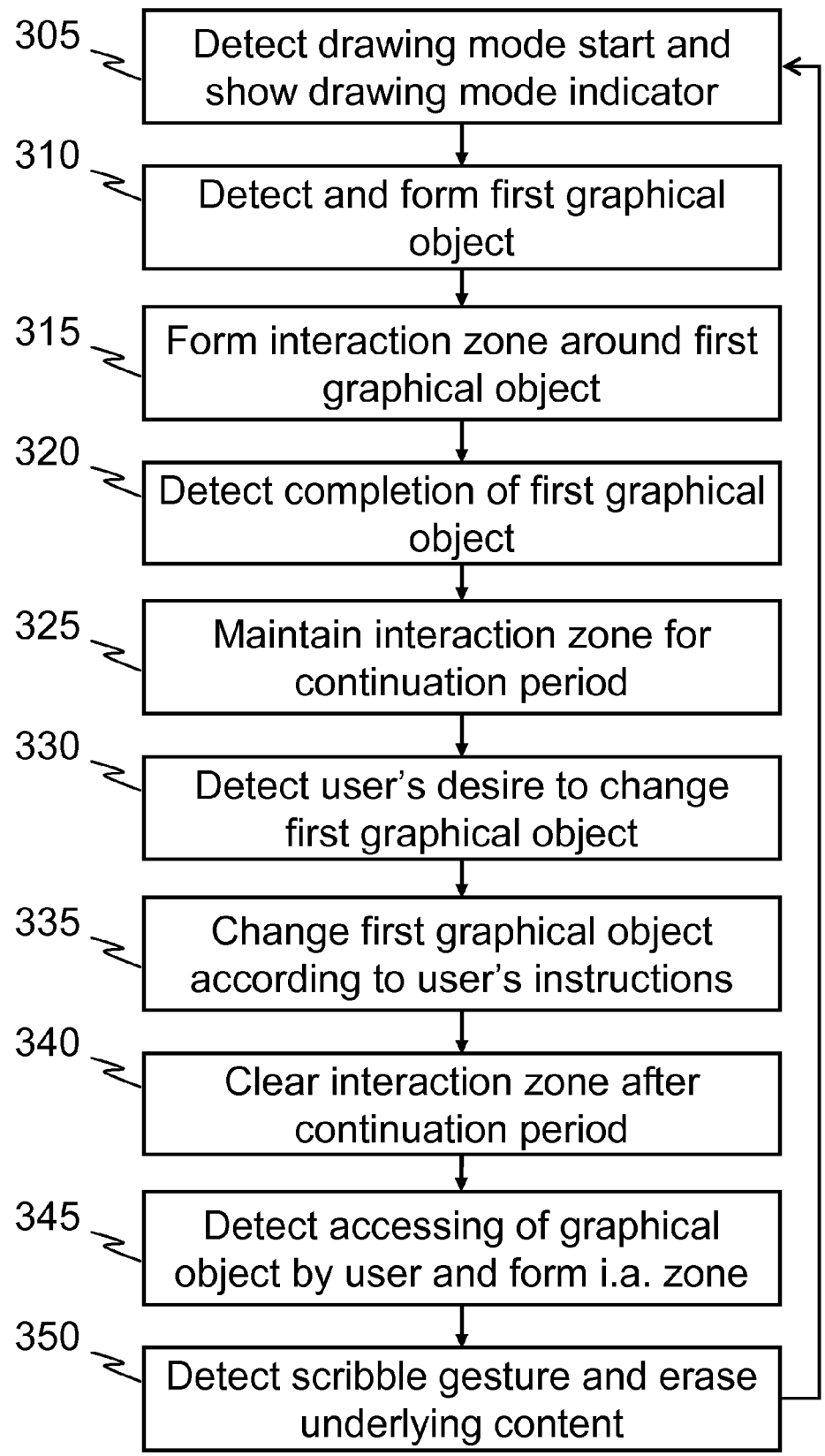
FIG. 3 shows a flow chart illustrative of an example embodiment.

FIG. 3 shows a flow chart illustrative of an example embodiment. The process of FIG. 3 is performed in one embodiment by the control unit 116. FIG. 3 is next described with further reference to FIGS. 4 to 15 that show various screen shots.

Figure 4:
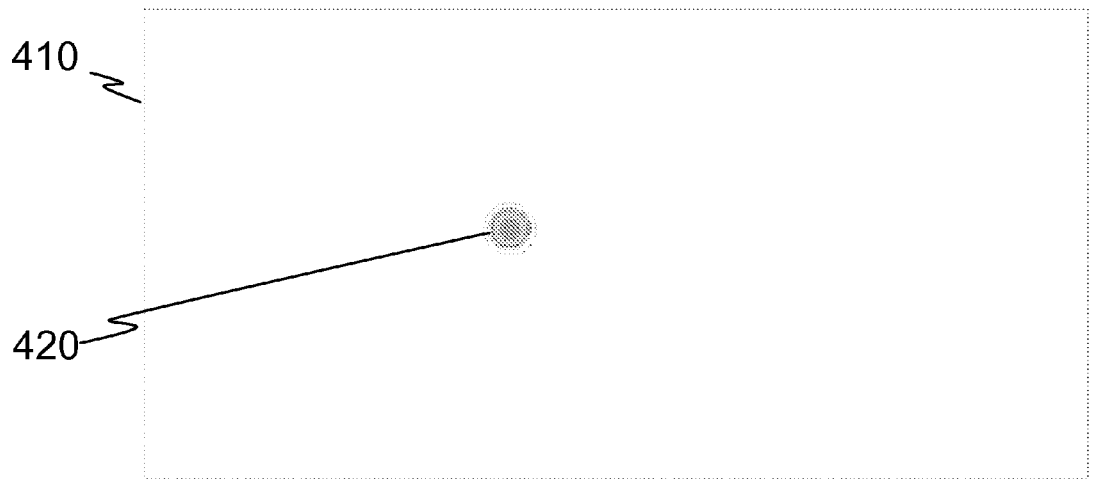
FIGS. 4 to 15 show screen shots illustrating various events described with reference to FIG. 3.

First, start of drawing mode is detected 305, FIG. 4. This detection is performed e.g. so that a user taps and holds anywhere on a drawing area 410, also referred to as a canvas. The tapping and holding can be either on the canvas background in empty space or on a piece of content. After a first period (e.g. 0.5 to 2 seconds, such as 0.8 seconds), a blue glow is shown beneath the user's finger as a drawing mode indication 420. This is a clear visual indication that the user is now in drawing mode.

Figure 5:
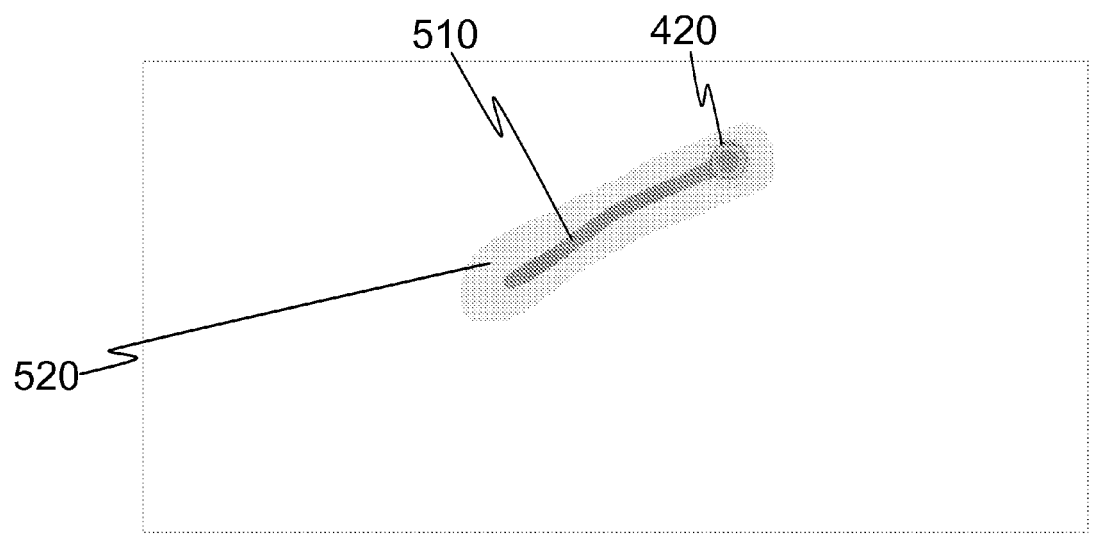

It is detected 310 that a user forms a first graphical object 510. In FIG. 5, with a finger still on the touch screen, the user moves the finger in one motion to draw a freehand line. The drawing mode indication 420 is shown under the user's finger.

In FIGS. 5 to 15, a drawing is used as an example of a graphical object. There are yet many other possibilities provided by different embodiments. The term graphical object may refer to any of: photographs, bitmap drawings, vector drawings, typography, numbers, symbols, maps. The drawings may be freehand drawings. Alternatively or additionally, the drawings may contain computer assisted forms such as lines, arcs, polygons and regression curves. It is also possible to form a graphical object by adding a photograph or other type of stored graphics and then combine other graphics or to add stored graphics to drawn or other stored graphics on the canvas.

Figure 6:
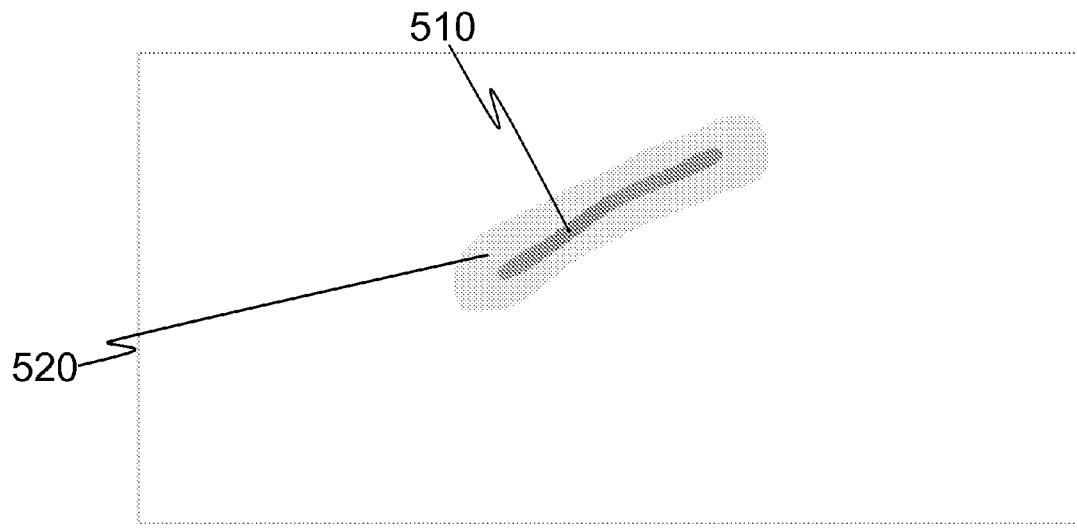
Figure 7:
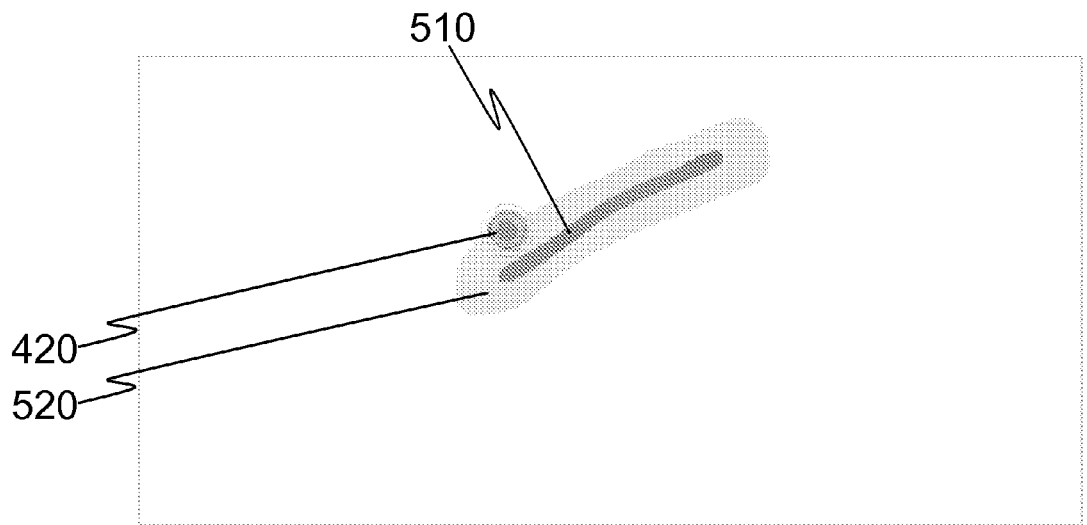

An interaction zone is formed 315 around the first graphical object 510, see zone 520 drawn in FIG. 5. FIG. 6 shows the first graphical object without the drawing mode indication 420 that is no longer shown after the user lifts the finger from the touch screen 112. In some embodiments, the interaction zone is formed only after completion of the first graphical object as in step 320 of FIG. 4. In this context, the completion may refer to completing only one phase in forming the first graphical as it is impossible e.g. by the control unit 116 to know if the drawing made by the user 120 is ready i.e. fully completed or not. Thus, completion may be understood simply as finishing one phase of forming or changing of the first graphical object 510. The completion of the adding or changing of the first graphical object 510 is determined in one example embodiment from receiving a pause signal from the user. The pause signal is, for instance, the aforementioned lifting of the finger from the touch screen 112. Other possibilities for producing the pause signal include e.g. releasing a button of a pointing device indicative of a desire to no longer continue the changing or adding of the first graphical object; and pressing a button indicative of a desire to no longer continue the changing or adding of the first graphical object.

Figure 8:
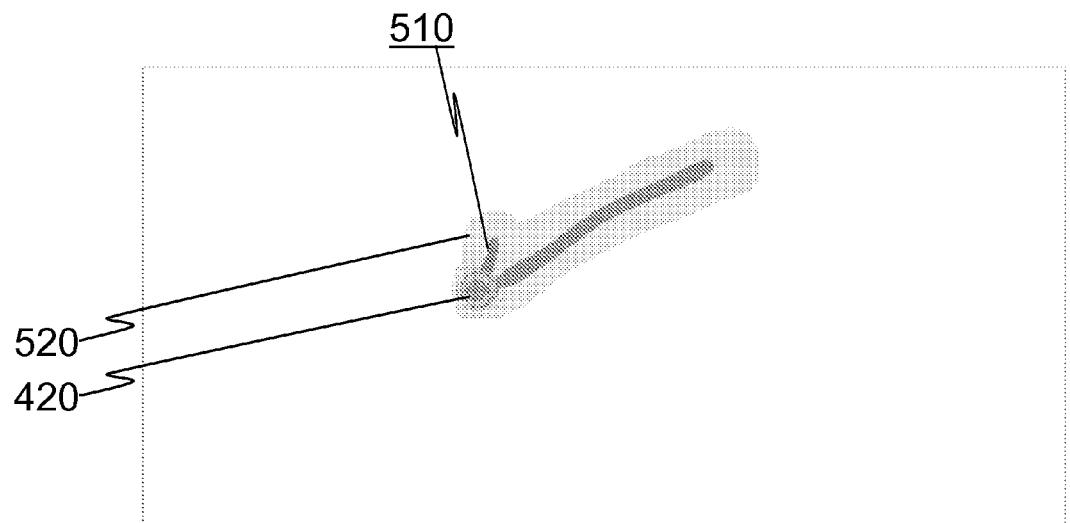
Figure 9:
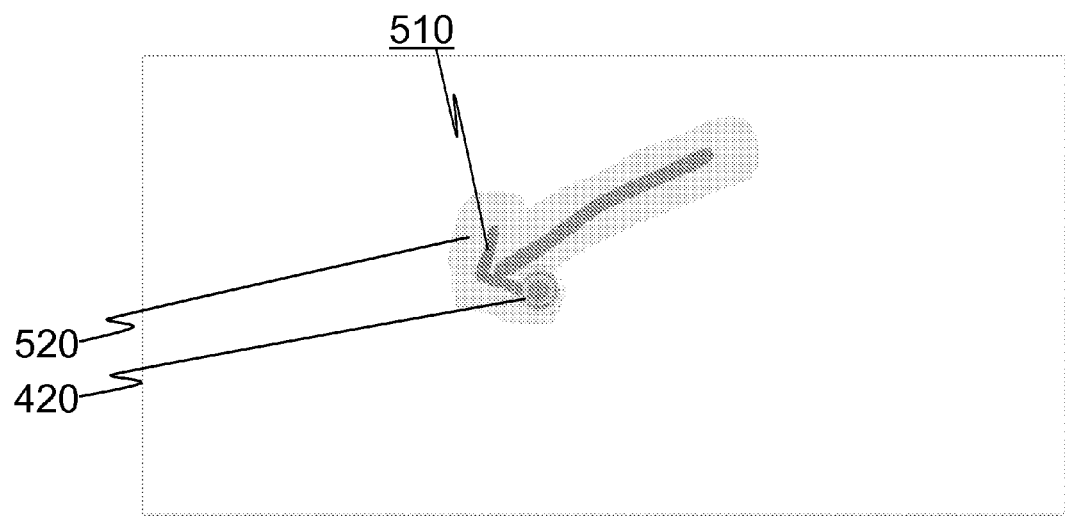
Figure 10:
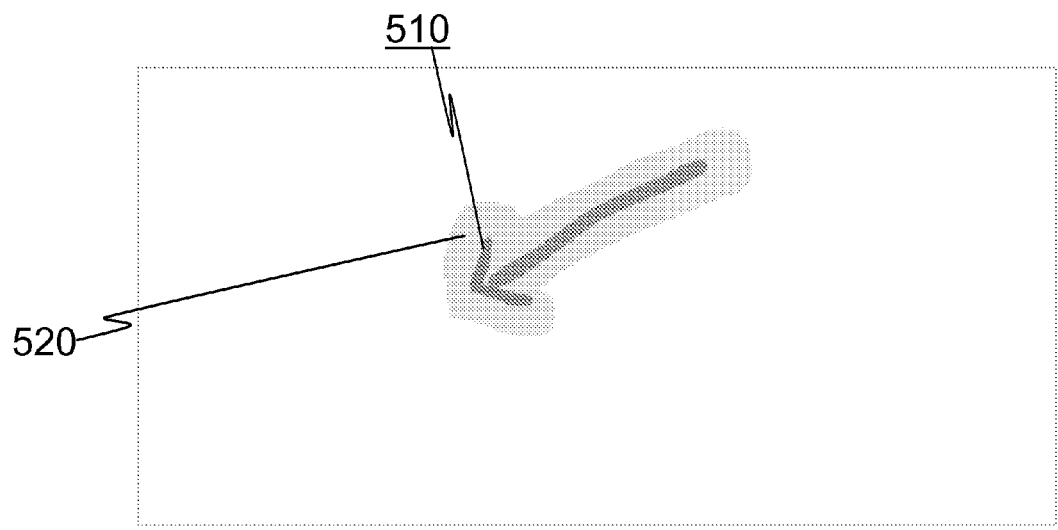
Figure 11:
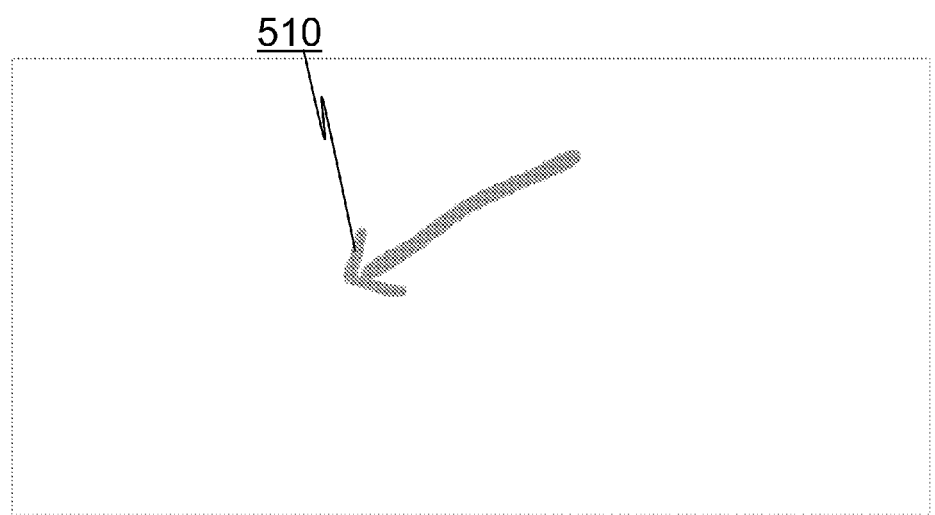
Figure 12:
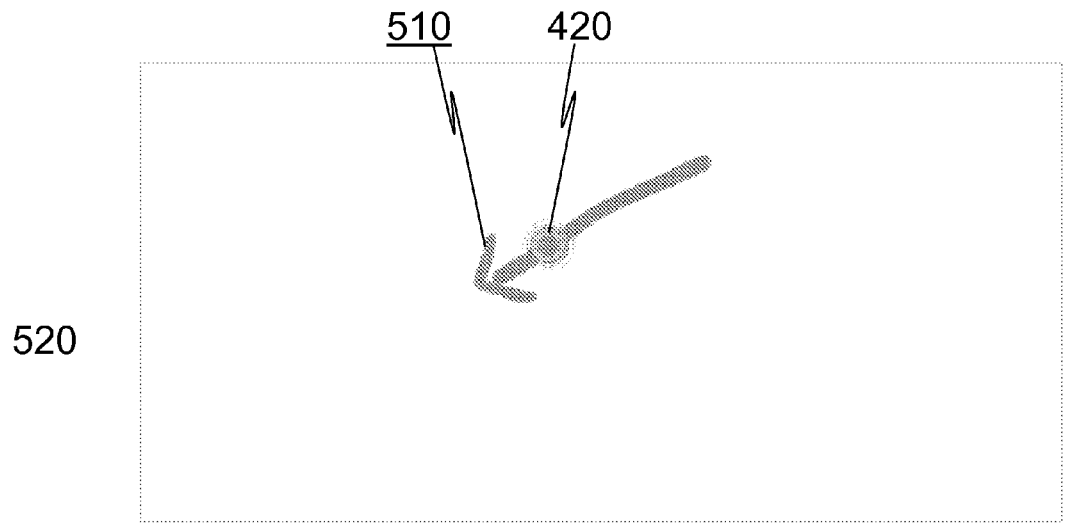
Figure 13:
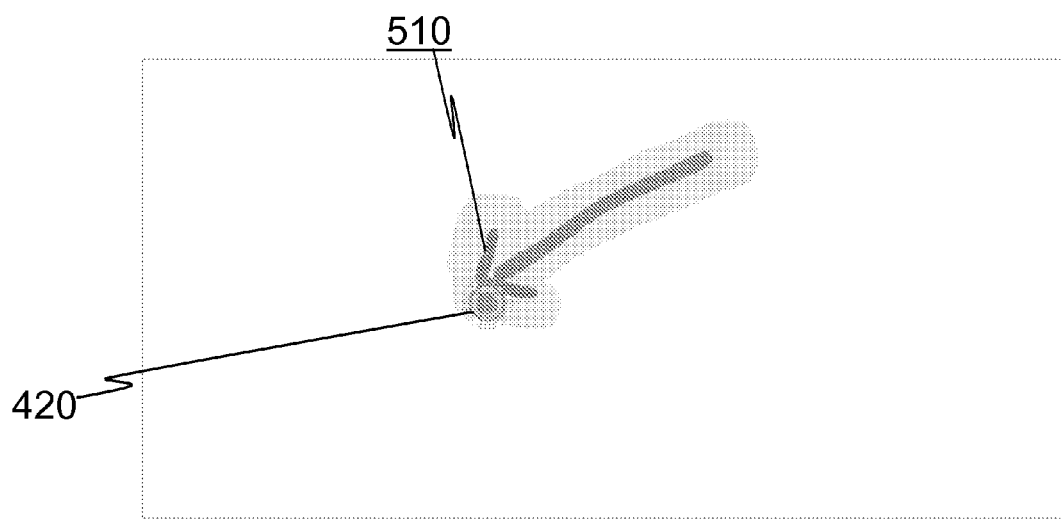

The interaction zone 520 is maintained 325 for a given continuation period such as one to five seconds or e.g. two or three seconds. If the user touches the canvas at the interaction zone 520 during the continuation period, this is determined as a desire to change the first graphical object 510. For instance, the user touches the canvas at the interaction zone 520 as shown by the drawing mode indication 420 in FIG. 7 and the control unit 116 detects 330 (FIG. 3) that the user desires to change the first graphical object 510. The user can then continue drawing on the canvas by moving the finger and the control unit 116 changes 335 first graphical object 510 according to so given user's instructions. Thus changed first graphical object 510 is shown in FIG. 8. The user may keep on changing the first graphical object 510 with a result such as that shown in FIG. 9 within the continuation period from the most recent change of the first graphical object, as each changing of the first graphical object 510 restarts the continuation period. For the time of changing the first graphical object 510 the continuation period expiry is not monitored or a respective timer is stopped in one example embodiment. After addition of two more lines, the first graphical object 510 now looks like an arrow in FIG. 10. After the continuation period, the interaction zone is cleared 340 (FIG. 3, see also FIG. 11).

A method of an example embodiment is next shown for erasing a graphical object in part or entirely. See FIGS. 12 and 13, accessing of a graphical object by the user is detected and the interaction zone is formed around the graphical object, step 345 in FIG. 3. This graphical object is referred to as a first graphical object as the object being manipulated is referred to as the first graphical object. Then a scribble on the first graphical object is detected 350 and the first graphical object is erased to the extent that the scribble covers the first graphical object. Notice that any other graphical objects near the first graphical object are not harmed by the scribble.

Figure 14:
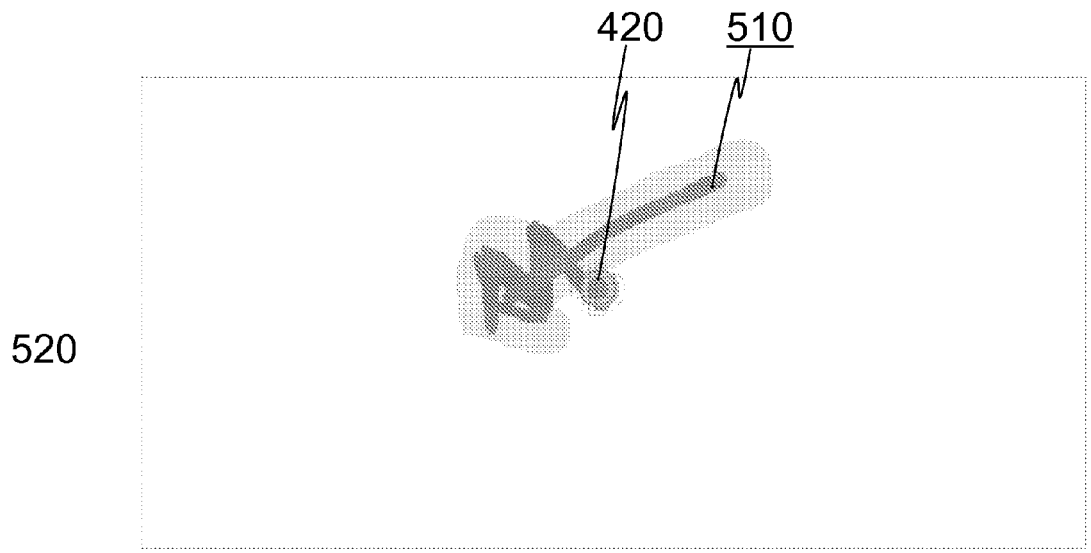
Figure 15:
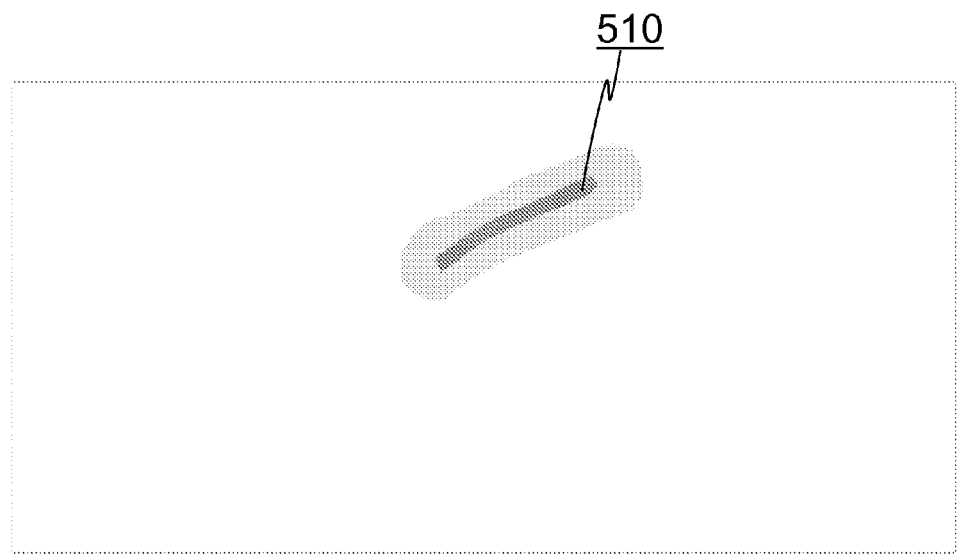

Depending on the embodiment, after recognizing that the new changes of the first graphical object 510 form a scribble, their drawing change either immediately or after the completion of the scribble. In one example, the scribble is detected from at least two lines being drawn back and forth over the first graphical object. Possibly the determining of the scribble may require that the new lines are drawn not only back and forth but also at least partly overlapping with each other. Also it may be determined whether a line starts with an angular difference sufficiently with the end of previous line i.e. if a new line starts to backtrack on a previous line and one or both of these lines cross the first graphical object 510. FIGS. 14 and 15 illustrate the drawing of a scribble over the first graphical object 510 and how a part of the first graphical object 510 is responsively erased. If the scribble covers the entire first graphical object 510, then the entire first graphical object 510 is erased in one example embodiment.

In one example embodiment, the touch screen 112 is configured to be concurrently operated by a number of users. Two or more graphical objects can then be independently processed as different first graphical objects. If two graphical objects cross or overlap with each other, erasing one of them will not change the other in one example embodiment. Moreover, one example embodiment provides a mechanism for ambiguity resolving in case a user accesses an area in which two or more graphical objects overlap. For instance, the overlapping graphical objects may be selected one by one with successive contacts at the overlapping part and highlighted e.g. by forming a corresponding interaction zone.

In the foregoing, by merging a second graphical object to the first graphical object it may be understood that the first and second graphical objects are grouped into one group of graphical objects. In this document, it is written that the first graphical object is changed by merging the second graphical object therein so that the description of possible subsequent further changes are simpler to describe. This does not mean bridging gaps between an earlier first graphical object and an added new graphical object such as a line when the second graphical object or a new drawing, for instance, is merged to the first graphical object. To the contrary, in one example embodiment, the changed first graphical object is subsequently processed as a grouped object. For instance, the grouping can be canceled by a user at a later point of time. To this end, it may be detected if a user taps the first graphical object when the interaction zone is not present and the user is presented with an option to ungroup the first graphical object. The user may be presented with also some other alternatives such as one or more of the following options: changing color; changing line style; changing line width; inserting a picture; copy the first graphical object onto a clipboard; select the first graphical object; change order of the first graphical object (e.g. move towards front or back); disable scribble erasing feature to enable drawing of a scribble as a new part of the first graphical object; enable scribble erasing feature; and delete the first graphical object.

Various embodiments have been presented. It should be appreciated that in this document, words comprise, include and contain are each used as open-ended expressions with no intended exclusivity.

The foregoing description has provided by way of nonlimiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. For instance, some steps of FIG. 3 can be omitted, performed a number of times and/or in a different order and further steps can be performed. Further exemplifying, in a multi-user environment, one or more of the steps of FIG. 3 may be performed based on input received from one user while performing any other steps based on input received from the same or another user.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
   an input module configured to receive user instructions for forming graphics in a drawing area based on the user instructions;
   a processor configured to cause:
   in response to addition or changing of a first graphical object, forming an interaction zone around the first graphical object and activating a timer for a predetermined continuation period;
   detecting if a second graphical object is drawn starting from within the interaction zone during the continuation period and merging the second graphical object with the first graphical object, in response to positive detection; and,
   upon expiration of the timer, disabling the interaction zone.

2. The apparatus of claim 1, wherein the processor is configured to form the interaction zone dynamically during the addition or changing of the first graphical object.

3. The apparatus of claim 1, wherein the processor is configured to form the interaction zone dynamically on drawing a line as if using a pen or a brush.

4. The apparatus of claim 1, wherein the processor is configured to form the interaction zone when the first graphical object is completely added or changed.

5. The apparatus of claim 4, wherein the processor is configured to determine the completion of the adding or changing of the first graphical object in response to a pause signal being received from a user.

6. The apparatus of claim 1, wherein the processor is further configured to cause displaying of the interaction zone.

7. The apparatus of claim 1, wherein the processor is configured to form again the interaction zone around the first graphical object in response to detecting a user pointing at the first graphical object.

8. The apparatus of claim 7, wherein the processor is configured to require a further command for the forming again of the interaction zone.

9. The apparatus of claim 1, wherein the processor is configured to operate in parallel with a plurality of first graphical objects.

10. The apparatus of claim 1, wherein the processor is configured to again invoke the interaction zone in response to detecting a re-invoking command and erasing a portion of the first graphical object in response to detecting drawing of a scribble over the first graphical object.

11. An apparatus as claimed in claim 1, wherein the timer is restarted in response to positive detection that the second graphical object is drawn starting from the interaction zone during the continuation period.

12. A method for forming graphics in a drawing area based on user instructions, comprising:
   in response to addition or changing of a first graphical object, forming an interaction zone around the first graphical object and activating a timer for a predetermined continuation period; and
   detecting if a second graphical object is drawn starting from the interaction zone during the continuation period and merging the second graphical object with the first graphical object, in response to positive detection; and,
   upon expiration of the timer, disabling the interaction zone.

13. The method of claim 12, further comprising causing drawing of a new second graphical object starting from the interaction zone.

14. The method of claim 12, wherein the interaction zone is formed dynamically during the addition or changing of the first graphical object.

15. The method of claim 12, wherein the interaction zone is formed when the first graphical object is completely added or changed.

16. The method of claim 12, further comprising causing displaying of the interaction zone.

17. The method of claim 12, wherein the method further comprises forming again the interaction zone around the first graphical object in response to detecting a user pointing at the first graphical object.

18. The method of claim 12, wherein the method is applied in parallel for a plurality of first graphical objects.

19. The method of claim 12, further comprising subsequently again invoking the interaction zone in response to detecting a re-invoking command and erasing a portion of the first graphical object in response to detecting drawing of a scribble over the first graphical object.

20. The method of claim 19, wherein the detecting of the drawing of the scribble comprises determining at least two lines being drawn in opposing directions over the first graphical object.

21. A method as claimed in claim 12 further comprising restarting the timer in response to the positive detection the second graphical object is drawn starting from the interaction zone during the continuation period.

22. A computer program stored in a non-transitory computer readable memory medium, comprising computer executable program code which when executed by at least one processor causes an apparatus to perform:

in response to addition or changing of a first graphical object, forming an interaction zone around the first graphical object and activating a timer for a predetermined continuation period;

detecting if a second graphical object is drawn starting from the interaction zone during the continuation period and if yes, merging the second graphical object with the first graphical object; and, upon expiration of the timer, disabling the interaction zone.

23. The computer program as claimed in claim 22, wherein upon detection that the second graphical object is drawn starting from the interaction zone during the continuation period, the timer is restarted.

* * * * *